US012090662B2

(12) United States Patent
Klenske et al.

(10) Patent No.: US 12,090,662 B2
(45) Date of Patent: Sep. 17, 2024

(54) CONTROLLER AND METHOD FOR SELECTING EVALUATION POINTS FOR A BAYESIAN OPTIMIZATION METHOD

(71) Applicant: Robert Bosch GmbH, Stuttgart (DE)

(72) Inventors: Edgar Klenske, Renningen (DE); Lukas Froehlich, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 707 days.

(21) Appl. No.: 17/323,785

(22) Filed: May 18, 2021

(65) Prior Publication Data
US 2021/0379761 A1    Dec. 9, 2021

(30) Foreign Application Priority Data
Jun. 3, 2020 (DE) .......................... 102020206916.6

(51) Int. Cl.
*B25J 9/16* (2006.01)
*G06F 17/18* (2006.01)
*G06N 7/01* (2023.01)

(52) U.S. Cl.
CPC ............ *B25J 9/1664* (2013.01); *G06F 17/18* (2013.01); *G06N 7/01* (2023.01)

(58) Field of Classification Search
CPC ......... B25J 9/1664; B25J 9/163; G06F 17/18; G06N 7/01; G06N 5/01; G06N 20/10; G05B 13/042; G05B 19/41885; G05B 2219/32339
See application file for complete search history.

(56) References Cited

U.S. PATENT DOCUMENTS

| 10,228,680 | B2* | 3/2019 | Chen | G05B 19/4155 |
| 2014/0358831 | A1* | 12/2014 | Adams | G06N 7/01 |
| | | | | 706/20 |
| 2016/0328655 | A1* | 11/2016 | Adams | G06N 5/048 |
| 2018/0284758 | A1* | 10/2018 | Cella | G06N 3/088 |

FOREIGN PATENT DOCUMENTS

| DE | 102010028259 A1 | 10/2011 |
| DE | 102013213420 A1 | 10/2014 |
| DE | 202019105304 U1 | 10/2019 |

* cited by examiner

*Primary Examiner* — Masud Ahmed
(74) *Attorney, Agent, or Firm* — NORTON ROSE FULBRIGHT US LLP; Gerard A. Messina

(57) ABSTRACT

A method is described for selecting evaluation points for a Bayesian optimization method for optimizing a physical or chemical process that is modeled by a statistical model. The method includes the ascertainment of a posterior model of the statistical model in accordance with the results of one or multiple evaluations at previous evaluation points and the selection of a next evaluation point by optimizing an acquisition function over a search space, which is given by a specified limit for the predictive variance of the points in the search space given by the posterior model.

10 Claims, 3 Drawing Sheets

CONTROLLER AND METHOD FOR SELECTING EVALUATION POINTS FOR A BAYESIAN OPTIMIZATION METHOD

CROSS REFERENCE

The present application claims the benefit under 35 U.S.C. § 119 of German Patent Application No. DE 102020206916.6 filed on Jun. 3, 2020, which is expressly incorporated herein by reference in its entirety.

FIELD

Various exemplary embodiments of the present invention relate generally to controllers and methods for selecting evaluation points for a Bayesian optimization method.

BACKGROUND INFORMATION

In control processes, for example when controlling a facility for producing a product or processing a workpiece or moving a robot, the relationship between the values of the control parameters and the result, that is, the observable output parameter values, may be very complex. Furthermore, such an evaluation of control parameter values may be laborious and encumbered with errors. Bayesian optimization (BO) is suitable in such cases for ascertaining control parameter values, since it makes it possible to optimize unknown black box functions when only noisy evaluations are available. The efficiency of a Bayesian optimization method depends substantially on how the evaluation points are selected. Accordingly, approaches for selecting evaluation points for a Bayesian optimization method are desirable that allow for efficient control, e.g., of a robot.

SUMMARY

According to various specific embodiments of the present invention, a method is provided for selecting evaluation points for a Bayesian optimization method for optimizing a physical or chemical process that is modeled by a statistical model, which includes the ascertainment of a posterior model of the statistical model in accordance with the results of one or multiple evaluations at previous evaluation points and the selection of a next evaluation point by optimizing an acquisition function over a search space, which is given by a specified limit for the predictive variance of the points in the search space given by the posterior model.

Bayesian optimization is a very versatile method for optimizing functions. A strength of this method is that it is very efficient in the sense that it requires few function evaluations in order to find the optimum and is able to handle noisy function evaluations and that no gradient information is required. This example method is thus suitable for a multitude of applications in which, e.g., the parameters of an experiment must be optimized in order to maximize a certain variable.

The method in accordance with an example embodiment of the present invention described above for selecting evaluation points for a Bayesian optimization method makes use of previous knowledge about good control parameter values and cautiously explores the control parameter space. This local approach (instead of a global approach) makes it possible to use Bayesian optimization for control parameter spaces of relatively high dimensionality (e.g., dimension 10 to 100). Examples of application are the design of control devices, the optimization of process parameters in production technology or the optimization of components that have a great number of control parameters.

The approach in accordance with an example embodiment of the present invention described above allows for an efficient optimization with regard to the number of required function evaluations (low so-called "simple regret") as well a careful exploration of the control parameter space so that damage (e.g., in a controlled device such as a robot) is avoided (low so-called "cumulative regret").

Various exemplary example embodiments of the present invention are disclosed below.

Exemplary embodiment 1 is a method for selecting evaluation points for a Bayesian optimization method as described above.

Exemplary embodiment 2 is a method in accordance with exemplary embodiment 1, the statistical model being a Gaussian process and the specified limit being a specified fraction of a signal variance of the kernel of the Gaussian process.

The modeling of processes by way of Gaussian processes allows for an efficient Bayesian optimization. By determining the specified limit as a function of the signal variance of the kernel of the Gaussian process, the search space is adapted to the kernel of the Gaussian process.

Exemplary embodiment 3 is a method in accordance with exemplary embodiment 1 or 2, a set of alternatives for the subsequent evaluation point being ascertained by sampling from the evaluation point range and one of the alternatives being selected as the next evaluation point for which the acquisition function assumes an optimum in the set of the alternatives.

This allows for an efficient optimization across the search space.

Exemplary embodiment 4 is a method in accordance with exemplary embodiment 3, the evaluation range being a subset of a parameter range and the set of alternatives being ascertained by sampling using a rejection method from the parameter range, samples being rejected that are not in the search space.

The search space, which is defined as described above, is generally not contiguous. The approach according to exemplary embodiment 4 in this case nevertheless allows for efficient sampling (i.e., the selection of random samples from the search space).

Exemplary embodiment 5 is a method in accordance with exemplary embodiment 4, the sampling in the parameter range including the sampling in subspaces of the parameter range, which respectively contain one or multiple of the previous evaluation points.

In this manner, it is possible to ensure that all relationship components of the search space are captured during the sampling. Selecting simple subspaces (in particular of low dimension, e.g., one-dimensional subspaces) furthermore makes it possible to perform the sampling with little effort.

Exemplary embodiment 6 is a controller, which is designed to carry out the method according to one of the exemplary embodiments 1 through 5.

Exemplary embodiment 7 is a production system, having a controller according to exemplary embodiment 6; a production facility, which is designed to produce a product using the physical or chemical process; and at least one sensor, which is designed to provide the controller with output parameter values of the physical or chemical process associated with control parameter values;

the controller being designed to ascertain one or multiple optimal control parameter values of the physical or chemical process using the Bayesian optimization method, in that it evaluates control parameter values by using the output parameter values, and to control the production facility in accordance with the one or multiple ascertained control parameter values.

Exemplary embodiment 8 is a processing system, comprising a controller according to exemplary embodiment 6, a processing facility, which is designed to process a workpiece using the physical or chemical process, at least one sensor, which is designed to provide the controller with output parameter values of the physical or chemical process associated with control parameter values;

the controller being designed to ascertain one or multiple optimal control parameter values of the physical or chemical process using the Bayesian optimization method, in that it evaluates control parameter values by using the output parameter values, and to control the processing facility in accordance with the one or multiple ascertained control parameter values.

Exemplary embodiment 9 is a robotic system, having a controller according to exemplary embodiment 6, a robotic element, which is designed to perform a movement using the physical or chemical process, at least one sensor, which is designed to provide the controller with output parameter values of the physical or chemical process associated with control parameter values, the controller being designed to ascertain one or multiple optimal control parameter values of the physical or chemical process using the Bayesian optimization method, in that it evaluates control parameter values by using the output parameter values, and to control the robotic element according to one or multiple received control parameter values.

Exemplary embodiment 10 is a computer program, comprising program instructions, which, when they are executed by one or multiple processors, prompt the one or multiple processors to carry out a method according to one of the exemplary embodiments 1 through 5.

Exemplary embodiment 11 is a computer-readable storage medium, on which program instructions are stored, which, when they are executed by one or multiple processors, prompt the one or multiple processors to carry out a method according to one of the exemplary embodiments 1 through 5.

Exemplary embodiments of the present invention are depicted in the figures and will be explained in greater detail below. In the figures, identical reference characters generally refer everywhere to the same parts in the multiple views. The figures are not necessarily to scale, the emphasis instead being generally placed on illustrating the features of the present invention.

DETAILED DESCRIPTION OF EXAMPLE EMBODIMENTS

The different specific embodiments of the present invention, in particular the exemplary embodiments described below, may be implemented using one or multiple circuits. In one specific embodiment, a "circuit" may be understood as any type of logic-implemented entity, which may be hardware, software, firmware or a combination thereof. Hence, in one specific embodiment, a "circuit" may be a hard-wired logic circuit or a programmable logic circuit such as for example a programmable processor, for example a microprocessor. A "circuit" may also be software, which is implemented or executed by a processor, for example any kind of computer program. In conformity with an alternative specific embodiment, any other kind of implementation of the respective functionalities, which are described in more detail below, may be understood as a "circuit".

Figure 1:
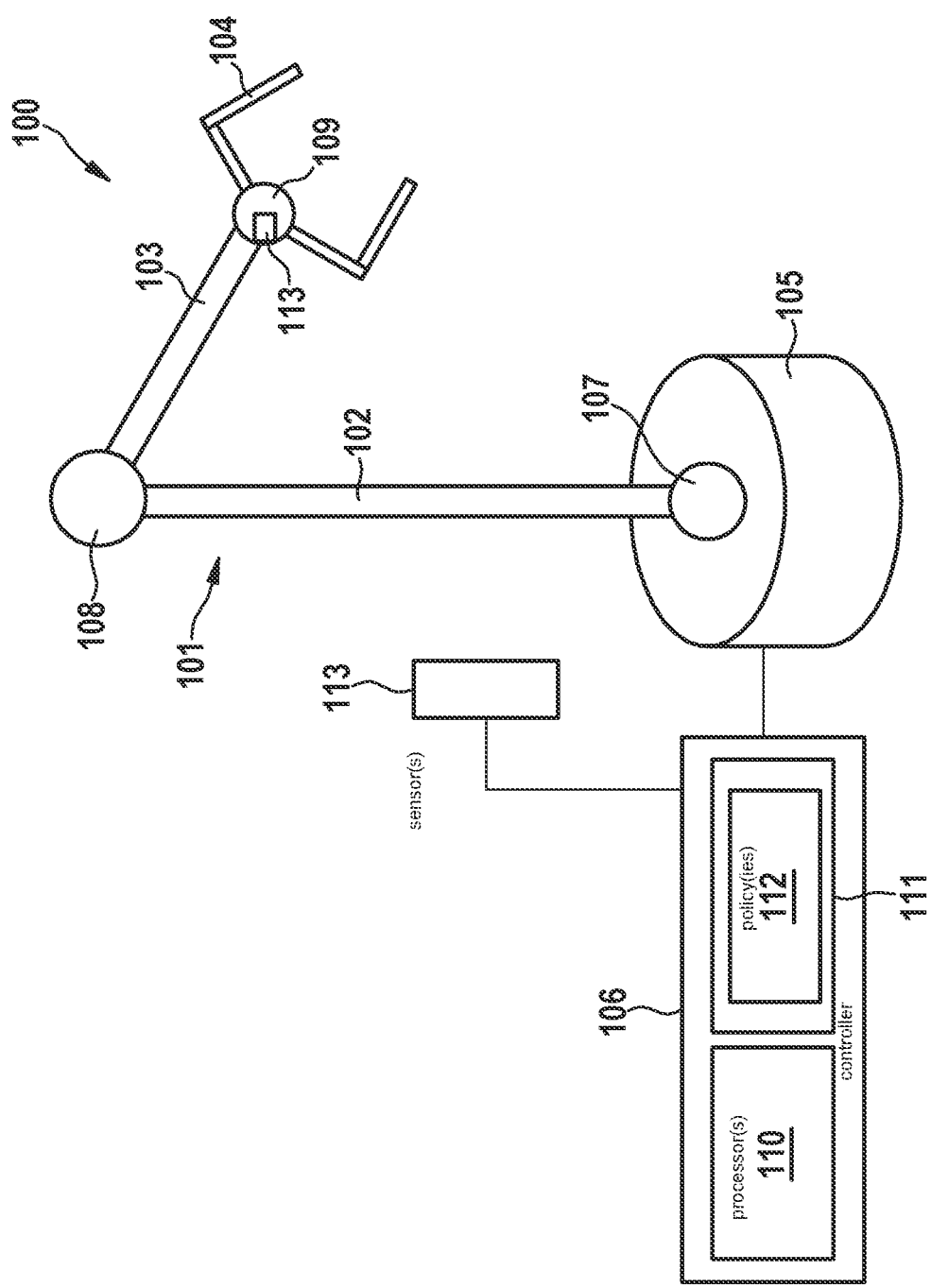
FIG. 1 shows a robot according to one specific embodiment of the present invention.

FIG. 1 shows a robot 100.

Robot 100 comprises a robotic arm 101 (generally a robotic element), for example an industrial robotic arm for moving, installing or processing a workpiece. Robotic arm 101 has robotic links 102, 103, 104 and a base (or generally a mounting support) 105, which supports the robotic links 102, 103, 104. The term "robotic link" refers to the movable parts of robotic arm 101, whose actuation allows for a physical interaction with the environment, e.g., in order to perform a task. For control, robot 100 comprises a controller 106, which is designed to realize the interaction with the environment in accordance with a control program. The last element 104 (as seen from base 105) of the robotic links 102, 103, 104 is also called an end effector 104 and may comprise one or multiple tools such as a welding torch, a gripping tool, a paint applicator or the like.

The other robotic links 102, 103 (closer to base 105) may form a positioning device, so that together with end effector 104, a robotic arm (or articulated arm) with end effector 104 at its end is provided. Robotic arm 101 is a mechanical arm, which is able to perform similar activities as a human arm (possibly with a tool at its end).

Robotic arm 101 may comprise connecting elements 107, 108, 109, which connect the robotic links 102, 103, 104 to one another and to base 105. A connecting element 107, 108, 109 may have one or multiple joints, each of which may provide a rotary motion and/or a translatory motion (i.e., a shift) for associated robotic links relative to one another. The movement of the robotic links 102, 103, 104 may be induced with the aid of actuators, which are controlled by controller 106.

The term "actuator" may be understood as a component that is suitable for influencing a mechanism in response to being driven. The actuator is able to implement instructions output by controller 106 (the so-called activation) into mechanical movements. The actuator, e.g., an electromechanical transducer, may be designed to convert electrical energy into mechanical energy in response to its activation.

The term "controller" may be understood as any kind of logical implementation unit, which may comprise for example a circuit and/or a processor, which is able to execute software, firmware or a combination thereof stored in a storage medium, and to issue the instructions, e.g., to an actuator in the present example. The controller may be set up for example by program code (e.g., software) to control the operation of a system, in the present example of a robot.

In the present example, controller 106 comprises one or multiple processors 110 and a memory 111, which stores code and data, on the basis of which processor 110 controls robotic arm 101. According to various specific embodiments, controller 106 controls robotic arm 101 on the basis of a policy 112 stored in memory 111.

It should be noted that the embodiment of robot 100 having a robotic arm is merely an example and that the robot may be embodied in the form of any machine in which mechanical elements (including valves and other movable parts) are controllable.

An example of a robot is a production machine improved by artificial intelligence, such as, e.g., a milling machine, a lathe, a deep hole drill, in which the controller 106 sets, e.g., the feed rate for a deep hole drill, the rotational speed of a milling head, etc., as a function of the current state of the machine (and/or of the time).

Policy 112 comprises control parameters for example, which influence the control behavior in order to balance out the production speed and the wear of the machine for example.

These parameters may be set by experts having know-how of many years (and may then be left unchanged). Even for experts it is difficult, however, to set controllers having more than 10 parameters for example (a number that may of course vary depending on the machine).

Starting from an initial setting of such control parameters by an expert, a possible application of the specific embodiments described below is to set the control parameters in such a way that a certain quality criterion is optimized, e.g., the production speed. Further fields of application could also be the control units for ESP (electronic stability program) or ABS (anti-lock system) in a vehicle.

In the case of a more complex robot (such as, e.g., a robot with a robotic arm 101 having a greater number of degrees of freedom) is rather uncommon that control parameters are set by experts since the number of parameters is here often greater than 20 to 50. For this reason, the parameters are typically set with the aid of simulations. Admittedly, the simulation often does not precisely correspond to reality and the parameters optimized in simulation do not fulfill the quality criteria for the real system (i.e., the real robot in its real environment). Nevertheless, the parameter values obtained by simulations can serve as a good start for the fine adjustment of the real system, similar to what the expert does in the above example of a simpler machine. For this purpose, it is not important how the control policy is parameterized. A very concrete application is here, e.g., the field of manipulation robotics for the automated assembly or disassembly of components.

Controller 106 is not only able to operate actuators in order to set the position in space of an element (such as, e.g., end effector 104), but is generally able to perform a control operation in order to set process parameters (for example by setting controlled elements such as a valve or a current supply) in a production process or processing process, such as for example the process temperature, process time, a vacuum or a gas atmosphere etc., in such a way that desired properties, such as hardness, strength, thermal conductivity, electric conductivity etc., of a workpiece are obtained.

In such a control scenario involving a robot, a machine, a production or processing facility, the output parameters are typically encumbered with noise. This mean that output parameter values (such as a reached position of a manipulated object or the achieved property of a workpiece) indeed depend on the input parameter values (i.e., the control parameters, which in turn result in specific process parameters), but vary, even if the control parameter values are identical.

To obtain desired output parameter values, control parameters should be determined in such a way that a target function that depends on the output parameters is optimized. For example, an object to be moved should be moved as closely as possible to the destination, a specific temperature should be set as precisely as possible or the hardness of a product should be as close as possible to a target value.

Since the output parameter values are encumbered with noise and the target function depends on the output parameter values, the target function is also encumbered with noise. Furthermore, the target function is typically unknown since it represents a complex relation of input parameter values and output parameters (on which its value depends).

Controller 106 may receive sensor data from one or multiple sensors 113 (in the example of a robot, e.g., a camera, in the case of other applications, e.g., temperature sensors, current sensors etc.), in order to obtain information about the output parameter values for specific input parameter values (i.e., control parameter values), i.e., in order to evaluate the target function. Sensors 113 may also be part of robotic arm 101, for example.

According to various specific embodiments, control parameters are ascertained for optimizing a physical or chemical process (i.e., a respectively given target function as described above) by using Bayesian optimization.

Bayesian optimization may be used if an unknown function f (a so-called "black box" function, such as the target function in the above examples) is to be optimized (minimized or maximized). This unknown function f is a function, which can only be evaluated or measured and observed (possibly encumbered with noise) for a value x. The observed value y is obtained as y=f(x)+e, where e represents the noise component. Additionally, it is assumed that every evaluation (measurement) of the unknown function f is expensive, i.e., incurs costs, in the sense that the evaluation of the unknown function causes a great expenditure, such as is the case, e.g., when performing an experiment on a test stand. On account of the expensive evaluation of the unknown function, it is desirable that only few evaluations have to be performed during the optimization. Under certain presuppositions, such as, e.g., the continuity of the unknown function, the unknown function may be approximated using a statistical model. Typically, a Gaussian process is used as the statistical model, i.e., a Gaussian process regression is performed for evaluation points $(x_1, \ldots, x_n)$ and evaluations at the evaluation points, i.e., of the observation of the respective function values $(y_1, \ldots, y_n)$ at the evaluation points.

It is a characteristic of the Gaussian process that the model prediction is very good in areas around the evaluation points and that the unknown function is approximated very well. This is reflected in a low uncertainty of the model prediction. Far away from previous evaluation points, the model predictions about the unknown function become poor and the uncertainty increases with increasing distance from the evaluation points. A possible strategy for optimizing function f is to evaluate the unknown function at many different points (e.g., on a regular grid) and to accept the lowest observed function value as the result of the optimization. This procedure, however, is inefficient and many evaluations of correspondingly high expenditure are required in order to find the optimum.

Instead of this approach, the Gaussian process itself may be used to select new evaluation points. For this purpose, a new evaluation point is selected for the evaluation in such a way that on the one hand the meaningfulness of the model is improved, e.g., so that the uncertainty of the estimated expected value of the unknown function is reduced. For this purpose, the evaluation points are normally selected in areas, in which the unknown function was not yet evaluated (exploration). On the other hand, a new evaluation point for evaluating the unknown function is selected in such a way that the objective of finding an optimum is achieved as quickly as possible or using a small number of measurements at the evaluation points. For this purpose, evaluation points are preferred for selection, which (in accordance with the Gaussian process) promise low (in the case of a minimization) or high (in the case of a maximization) function values (exploitation). These two opposed criteria are balanced out in that the evaluation point is selected with the aid of a predefined acquisition function. The acquisition function makes use of the Gaussian process, that is, the expected value μ(x) and the standard deviation σ(x) associated with this expected value.

An example is the so-called LCB (lower confidence bound) acquisition function, which is given as follows:

LCB(x)=μ(x)−kσ(x).

The factor k is defined for example as a constant of a specific value, such as, e.g., k=2. This criterion may be minimized efficiently using common gradient-based methods, and the position of the minimum of LCB(x) then forms the new evaluation point for the unknown function f.

Here, attention must be paid to the fact that the optimization of the acquisition function occurs over a specific range, that is, a range, within which the search for the next evaluation point is performed.

Following the evaluation of the function f at the selected next evaluation point, the Gaussian process is updated with new data and a next evaluation point is selected in accordance with the method described above. Typically, this selection of an evaluation point, an evaluation at the selected evaluation point and an updating of the Gaussian process in accordance with the evaluation is repeated iteratively until a termination criterion is fulfilled, that is, e.g., until the period of time that is to be expended for optimizing the unknown function f has elapsed.

In the case of the minimization of the function, the point (i.e., input parameter value vector or control parameter value vector) is then output as the location of the minimum of the function that minimizes the expected value of the Gaussian process. In a maximization, in analogous fashion, the point is output that maximizes the expected value of the Gaussian process. This point then indicates the control parameter value vector, according to which the robot or the machine or facility is controlled.

Other acquisition functions may also be used besides the LCB acquisition function, which are based on other acquisition criteria such as, e.g., EI (expected improvement), UCB (upper confidence bound), PI (probability of improvement) or also so-called entropy search methods that are based on information-theoretical considerations.

As mentioned above, the optimization of the acquisition function over a specific range of control parameter values and control parameter value combinations (i.e., control parameter vectors, also referred to below as points of the control parameter space or search space). For this purpose, the user may define an optimization range (i.e., search space), of which the user assumes that the global optimum of the function to be optimized is located therein. In this regard, attention must be paid to the following:

1) The choice of the optimization domain has a great influence on the convergence to the optimum and should neither be too great (convergence takes too long) nor too small (good parameter values are possibly missing).
2) In hardware applications, there may be control parameter settings that potentially harm or damage the system so that these ranges should not be investigated.
3) If the optimization process is started on the basis of expert knowledge with a good first estimate, then the optimization is not global, but rather local.

According to various specific embodiments, these three facts are taken into account in that in the optimization the evaluation is performed in proximity to points that have already been evaluated. This frees the user from having to define an optimization range, it carefully explores the control parameter space and remains close to the starting estimate.

Various specific embodiments provide for defining the search space from evaluation to evaluation as a function of the predictive variance given by the current posterior Gaussian process (i.e., the Gaussian process following the update using the most recent evaluation). The next evaluation point is selected as follows, for example:

$$x_{n+1} = \arg\max_{x \in C_n} \alpha(x),$$

where $$C_n = \{x | \sigma_n^2(x) \leq \gamma \sigma_f^2\}$$

is the confidence range that contains all points whose predictive posterior variance (i.e., variance of the posterior model, e.g., posterior Gaussian process) is smaller than a specified limit.

In this example, the specified limit is given by a specified fraction γ∈(0.1) of the signal variance $\sigma_n^2(x)$ of the kernel of the Gaussian process. The kernel of the Gaussian process is given for example by $$k(x_i, x_j) = \sigma_n^2 \exp\left(-\frac{1}{l^2} d(x_i, x_j)\right)$$

where $d(x_i, x_j)$ is the distance between two input parameter vectors (i.e., possible evaluation points) and l is the length scaling of the kernel.

Attention should be paid to the fact that the confidence range grows when a new evaluation point was selected, evaluated and the Gaussian process has been updated (i.e., the posterior Gaussian process additionally takes into account the new evaluation at the new evaluation point). The relative size of the search space may be adjusted by setting the confidence parameter γ, which determines how "cautious" the exploration behavior of the optimization is. The confidence parameter γ may also be set to a fixed value, e.g., smaller than 1 such as 0.1 or 0.5, or starting from this value it may be adjusted (e.g., reduced) in the course of the iterations.

It should be noted that the selection of the limit in accordance with the kernel signal variance of the Gaussian process is merely an example. It is also possible to use other statistical models, which make confidence assertions (that is, assertions about the variance of points), such as, e.g., a Bayesian neural network, and to specify the limit accordingly (e.g., absolutely or as a function of a (hyper) parameter of the statistical model, as in the example above).

Figure 2:
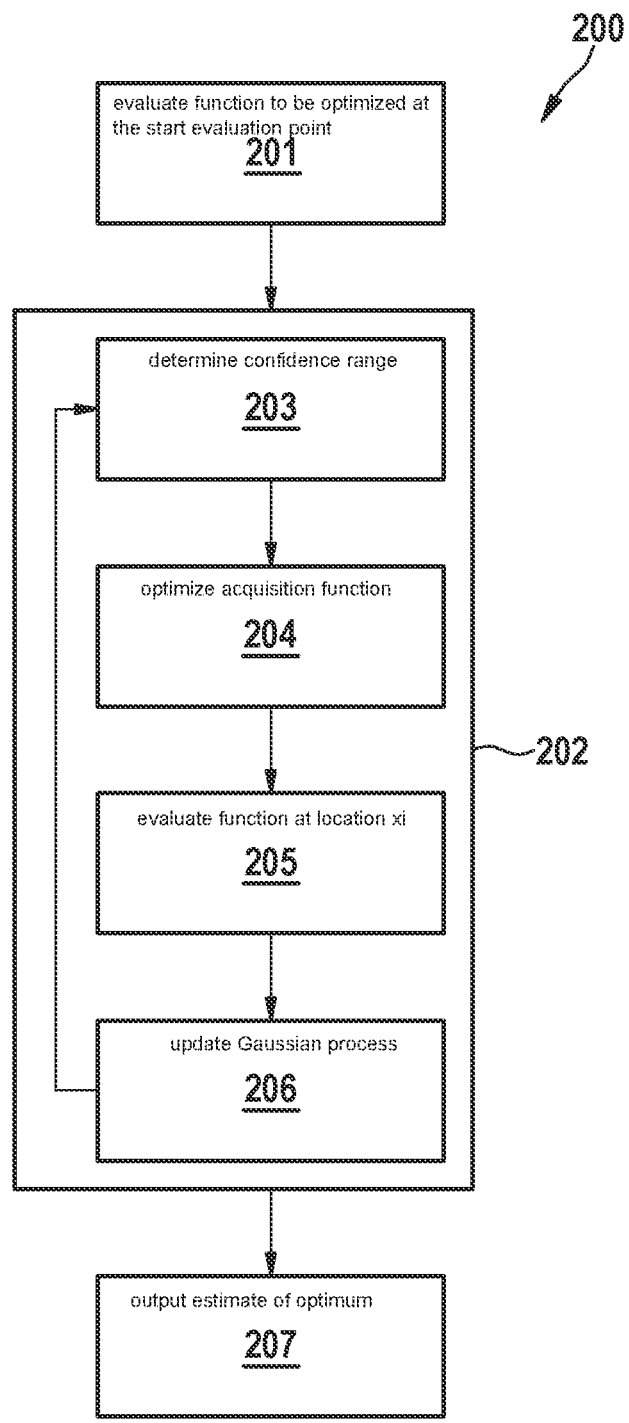
FIG. 2 shows a flow chart, which illustrates a method for ascertaining control parameters using Bayesian optimization according to one specific embodiment of the present invention.

FIG. 2 shows a flow chart, which illustrates a method for ascertaining control parameters using Bayesian optimization.

In 201, a start evaluation point $x_0$ is given (e.g., a first estimate based on expert knowledge) and the function f to be optimized is evaluated at this evaluation point in order to obtain a ("zeroth") observation $y_0=f(x_0)+e_0$.

In 202, a while loop is executed for as long as a stop criterion is not yet fulfilled (e.g., the maximum number of iterations is not yet reached).

In each iteration:
- in 203, the confidence range $C_n$ is determined (e.g., by using the predictive variance, as the current Gaussian process (i.e., the posterior Gaussian process, into which all past evaluations were entered) indicates it);
- in 204, an acquisition function (e.g., LCB) is optimized over the confidence range in order to obtain a new (i.e., the next) evaluation point xi;
- In 205, the function f is evaluated at location $x_1$ in order to obtain a new (ith) observation $y_i=f(x_i)+e_i$;
- In 206, the Gaussian process is updated using the ith evaluation.

Following the termination of the while loop, the estimate of the optimum (e.g., the control parameter vector, at which the Gaussian process has the maximum or minimum expected value) is output in 207.

The optimization of the acquisition function may be performed in a two-step process:
1) sampling (i.e., taking random samples) from the optimization range (i.e., the confidence range), for example in uniform distribution or according to a Sobol sequence or by using Latin Hypercube Sampling.
2) local optimization around the point of the sampled points, at which the acquisition function is at a maximum, e.g., by using sequential quadratic programming (SQP) or so-called trust region interior point techniques.

Since the confidence range is generally not contiguous and not convex, according to one specific embodiment a rejection sampling method is used for sampling points in the confidence range, e.g., using successively selected one-dimensional subspaces. Algorithm 1 (in pseudo code) is an example for such a procedure.

---

Algorithm 1

1: Input: g(x): function, which defines the sampling range
$\mathcal{G} = \{x | g(x) \geq 0\}$
N: number of desired samples, $\tilde{x}$: starting point
2: Output: set of N sampling points $\mathcal{S} = \{x_s\}_{1:N}$ where $x_s \in \mathcal{G}$
3: $\mathcal{S} \leftarrow \{\tilde{x}\}$
4: while $|\mathcal{S}| \leq N$
5: $\mathcal{R} \leftarrow \{\tilde{x} + \lambda r : \lambda \in \mathbb{R}\} \cap \mathcal{G}$, where r is a random direction
6: $\tilde{x} \leftarrow \mathcal{U}(\mathcal{R})$, sample uniformly distributed over random subspace
7: $\mathcal{S} \leftarrow \mathcal{S} \cup \tilde{x}$, add sampling point to output set
8: end while
9: return $\mathcal{S}$

---

One possibility for optimizing the acquisition function is also the sampling in accordance with a proposal distribution, which is updated at each evaluation (of the acquisition function) in the direction of promising control parameter ranges. Using the confidence range makes it possible implicitly to reduce the increment between updates.

Figure 3:
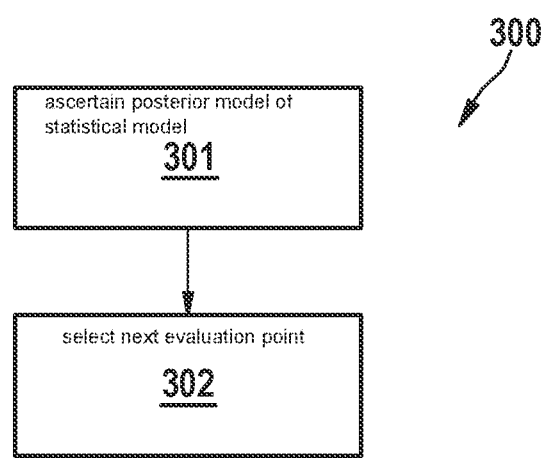
FIG. 3 shows a flow chart, which illustrates a method according to one specific embodiment of the present invention for selecting evaluation points for a Bayesian optimization method.

In summary, a method is provided in accordance with various specific embodiments, as it is illustrated in FIG. 3.

FIG. 3 shows a flow chart 300, which illustrates a method for selecting evaluation points for a Bayesian optimization method for optimizing a physical or chemical process, which is modeled by a statistical model.

In 301, a posterior model of the statistical model is ascertained corresponding to the results of one or multiple evaluations at previous evaluation points (e.g., an a posteriori Gaussian process to a Gaussian process).

In 302, a next evaluation point is selected by optimizing an acquisition function over a search space, which is given by a specified limit for the predictive variance of the points in the search space given by the posterior model.

In other words, according to various specific embodiments, the acquisition function for determining the next evaluation point is optimized in a Bayesian optimization method over a point range that contains the points for which the predictive variance of the posterior model is smaller than a specified limit. In other words, the range, in which the next evaluation point is sought, is limited to a range that contains points for which the predictive variance of the posterior model is smaller than a specified limit.

The Bayesian optimization method may be used for example for ascertaining control parameters, for example for a robot. Each evaluation point corresponds for example to a control parameter value vector having multiple (e.g., 10 to 20) components, each component indicating a value of a control parameter of the physical or chemical process (e.g., temperature, speed, voltage etc.).

A "robot" may be understood as any physical system (having a mechanical component, whose movement is controlled), such as a computer-controlled machine, a vehicle, a household appliance, an electric tool, a production machine, a personal assistant or an access control system.

Although the present invention was shown and described primarily with reference to specific embodiments, those skilled in the art should understand, based on the disclosure herein, that numerous modification may be made to these with respect to design and details, without departing from the essence and scope of the present invention. The scope of the present invention includes all combinations and modification of the features disclosed herein.

What is claimed is:

1. A method for selecting evaluation points for a Bayesian optimization method for optimizing a physical or chemical process, which is modeled by a statistical model, comprising the following steps:
    ascertaining a posterior model of the statistical model corresponding to results of one or multiple evaluations at previous evaluation points;
    selecting a next evaluation point by optimizing an acquisition function over a search space, which is given by a specified limit for a predictive variance of points in the search space given by the posterior model, wherein a range, in which the next evaluation point is sought, is limited to a range that contains points for which a predictive variance of the posterior model is smaller than a specified limit, wherein each selected evaluation point corresponds to a respective control parameter; and
    performing the physical or chemical process in accordance with each respective control parameter.

2. The method as recited in claim 1, wherein the statistical model is a Gaussian process and the specified limit is a specified fraction of a signal variance of a kernel of the Gaussian process.

3. The method as recited in claim 1, wherein a set of alternatives for the next evaluation point is ascertained by sampling from an evaluation point range and one of the alternatives is selected as the next evaluation point, for which the acquisition function assumes an optimum in a set of the alternatives.

4. The method as recited in claim 3, wherein the evaluation range is a subset of a parameter range and the set of alternatives is ascertained by sampling using a rejection method from the parameter range, samples being rejected that are not in the search space.

5. The method as recited in claim 4, wherein the sampling in the parameter range includes the sampling in subspaces of the parameter range, which respectively contain one or multiple of the previous evaluation points.

6. A controller configured to select evaluation points for a Bayesian optimization method for optimizing a physical or chemical process, which is modeled by a statistical model, the controller configured to:
- ascertain a posterior model of the statistical model corresponding to results of one or multiple evaluations at previous evaluation points; and
- select a next evaluation point by optimizing an acquisition function over a search space, which is given by a specified limit for a predictive variance of points in the search space given by the posterior model, wherein a range, in which the next evaluation point is sought, is limited to a range that contains points for which a predictive variance of the posterior model is smaller than a specified limit, wherein each selected evaluation point corresponds to a respective control parameter; and
- perform the physical or chemical process in accordance with each respective control parameter.

7. A production system, comprising:
a controller configured to select evaluation points for a Bayesian optimization method for optimizing a physical or chemical process, which is modeled by a statistical model, the controller configured to:
- ascertain a posterior model of the statistical model corresponding to results of one or multiple evaluations at previous evaluation points, and
- select a next evaluation point by optimizing an acquisition function over a search space, which is given by a specified limit for a predictive variance of points in the search space given by the posterior model wherein a range, in which the next evaluation point is sought, is limited to a range that contains points for which a predictive variance of the posterior model is smaller than a specified limit;

a production facility, which configured to manufacture a product using the physical or chemical process; and
at least one sensor that is configured to provide the controller with output parameter values of the physical or chemical process associated with control parameter values;
wherein the controller is configured to:
- ascertain one or multiple optimal control parameter values of the physical or chemical process using the Bayesian optimization method, in that it evaluates control parameter values by using the output parameter values, and
- control the production facility according to the one or multiple ascertained control parameter values.

8. A processing system, comprising
a controller configured to select evaluation points for a Bayesian optimization method for optimizing a physical or chemical process, which is modeled by a statistical model, the controller configured to:
- ascertain a posterior model of the statistical model corresponding to results of one or multiple evaluations at previous evaluation points, and
- select a next evaluation point by optimizing an acquisition function over a search space, which is given by a specified limit for a predictive variance of points in the search space given by the posterior model wherein a range, in which the next evaluation point is sought, is limited to a range that contains points for which a predictive variance of the posterior model is smaller than a specified limit;

a processing facility, which is configured to process a workpiece using the physical or chemical process; and
at least one sensor that is configured to provide the controller with output parameter values of the physical or chemical process associated with control parameter values;
wherein the controller is configured to:
- ascertain one or multiple optimal control parameter values of the physical or chemical process using the Bayesian optimization method, in that it evaluates control parameter values by using the output parameter values; and
- control the processing facility according to the one or multiple ascertained control parameter values.

9. A robotic system, comprising:
a controller configured to select evaluation points for a Bayesian optimization method for optimizing a physical or chemical process, which is modeled by a statistical model, the controller configured to:
- ascertain a posterior model of the statistical model corresponding to results of one or multiple evaluations at previous evaluation points, and
- select a next evaluation point by optimizing an acquisition function over a search space, which is given by a specified limit for a predictive variance of points in the search space given by the posterior model wherein a range, in which the next evaluation point is sought, is limited to a range that contains points for which a predictive variance of the posterior model is smaller than a specified limit;

a robotic element that is configured to perform a movement using the physical or chemical process; and
at least one sensor that is configured to provide the controller with output parameter values of the physical or chemical process associated with control parameter values;
wherein the controller is configured to:
- ascertain one or multiple optimal control parameter values of the physical or chemical process using the Bayesian optimization method, in that it evaluates control parameter values by using the output parameter values; and
- control the robotic element according to the one or multiple ascertained control parameter values.

10. A non-transitory computer-readable storage medium on which are stored program instructions for selecting evaluation points for a Bayesian optimization method for optimizing a physical or chemical process, which is modeled by a statistical model, the program instructions, when executed by one or more processors, causing the one or more processors to perform the following steps:
- ascertaining a posterior model of the statistical model corresponding to results of one or multiple evaluations at previous evaluation points; and
- selecting a next evaluation point by optimizing an acquisition function over a search space, which is given by a specified limit for a predictive variance of points in the search space given by the posterior model, wherein a range, in which the next evaluation point is sought, is limited to a range that contains points for which a predictive variance of the posterior model is smaller than a specified limit, wherein each selected evaluation point corresponds to a respective control parameter; and
performing the physical or chemical process in accordance with each respective control parameter.

\* \* \* \* \*